(12) United States Patent
Huffman

(10) Patent No.: US 11,297,807 B2
(45) Date of Patent: Apr. 12, 2022

(54) RAMPED PLATFORM DEVICE

(71) Applicant: David Huffman, San Antonio, TX (US)

(72) Inventor: David Huffman, San Antonio, TX (US)

( * ) Notice: Subject to any disclaimer, the term of this patent is extended or adjusted under 35 U.S.C. 154(b) by 134 days.

(21) Appl. No.: 16/776,105

(22) Filed: Jan. 29, 2020

(65) Prior Publication Data

US 2021/0227804 A1 Jul. 29, 2021

(51) Int. Cl.
*A01K 63/00* (2017.01)
*A01K 1/035* (2006.01)

(52) U.S. Cl.
CPC ............ *A01K 63/006* (2013.01); *A01K 1/035* (2013.01)

(58) Field of Classification Search
CPC ...... A01K 1/035; A01K 1/0356; A01K 31/12; A01K 63/006; A01K 29/00; A47F 5/0006; A47F 5/0838
USPC .......................................... 119/246; 248/215
See application file for complete search history.

(56) References Cited

U.S. PATENT DOCUMENTS

| | | | |
|---|---|---|---|
| 2,727,489 A * | 12/1955 | Sklar ...................... | A01K 61/85 119/51.04 |
| 3,141,442 A * | 7/1964 | Harris ................... | A01K 63/006 119/246 |
| 3,699,921 A | 10/1972 | Janicek | |
| 3,891,053 A * | 6/1975 | Burton ...................... | E06C 7/08 182/97 |
| 4,184,450 A * | 1/1980 | Atchley ................ | A01K 1/0356 119/464 |
| 4,820,556 A | 4/1989 | Goldman | |
| 4,893,363 A * | 1/1990 | Huff ........................ | E04H 4/144 108/47 |
| D315,230 S | 3/1991 | Cronk | |
| 5,005,522 A * | 4/1991 | Gordon .................... | A01K 1/03 119/265 |
| 5,121,709 A | 6/1992 | Wechsler | |
| 6,029,605 A * | 2/2000 | Licata .................. | A01K 63/003 119/246 |
| 6,029,606 A * | 2/2000 | Youngstrom ........ | A01K 63/003 119/246 |
| 6,199,510 B1 * | 3/2001 | Louden ................ | A01K 1/0356 119/51.01 |
| D451,743 S * | 12/2001 | Henderson ...................... | D6/562 |
| 6,532,899 B1 | 3/2003 | Hootman | |
| 6,643,879 B1 * | 11/2003 | Davis ...................... | A01K 15/02 14/69.5 |
| D506,039 S * | 6/2005 | Woodruff ...................... | D30/121 |
| 7,086,349 B2 * | 8/2006 | Bagnall ................ | A01K 63/006 119/246 |
| 7,523,516 B1 * | 4/2009 | Waddell, V ............... | E04H 4/06 14/69.5 |

(Continued)

FOREIGN PATENT DOCUMENTS

| | | | | |
|---|---|---|---|---|
| CA | 2516823 A1 * | 5/2006 | ............. | F21V 21/02 |
| WO | WO0223982 | 3/2002 | | |

*Primary Examiner* — Lisa L Tsang

(57) ABSTRACT

A ramped platform device for a vivarium includes a first plate that has a fastener engaged to an upper for coupling to an upper rim of a wall of the vivarium, such as an aquarium or a terrarium. The first plate is in substantial abutment to an inner face of the wall. A platform is coupled to and extends substantially perpendicularly from a lower end of the first plate. A second plate that is coupled to and which extends transversely and downwardly from a perimeter of the platform allows an animal to climb up and down from the platform.

14 Claims, 6 Drawing Sheets

(56) References Cited

U.S. PATENT DOCUMENTS

| | | |
|---|---|---|
| 7,918,187 B2 | 4/2011 | Bagnall |
| 7,975,653 B2 * | 7/2011 | Cash ...................... A01K 31/04 |
| | | 119/467 |
| 8,166,921 B2 * | 5/2012 | Biggs ...................... A01G 9/12 |
| | | 119/246 |
| 10,172,329 B2 | 1/2019 | Szot |
| 2015/0308615 A1 * | 10/2015 | Neaves ................ A01K 5/0114 |
| | | 119/61.57 |

* cited by examiner

RAMPED PLATFORM DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to platform devices and more particularly pertains to a new platform device for a vivarium.

(2) Description of Related Art Including Information Disclosed Under 37 CFR 1.97 and 1.98

The prior art relates to platform devices for vivaria. Prior art platform devices for vivaria may comprise a ramp that extends to a platform that is positioned outside the confines of the aquarium, platforms with and without ramps that are attachable to a wall of the aquarium, table-like platforms, and floating platforms.

(h) BRIEF SUMMARY OF THE INVENTION

An embodiment of the disclosure meets the needs presented above by generally comprising a first plate that has a fastener engaged to an upper end thereof. The fastener is configured to engage an upper rim of a wall of a vivarium, such as an aquarium or a terrarium. The first plate is in substantial abutment to an inner face of the wall. A platform is coupled to and extends substantially perpendicularly from a lower end of the first plate. A second plate is coupled to and extends transversely and downwardly from a perimeter of the platform. The second plate is configured for traversal of an animal to and from the platform.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
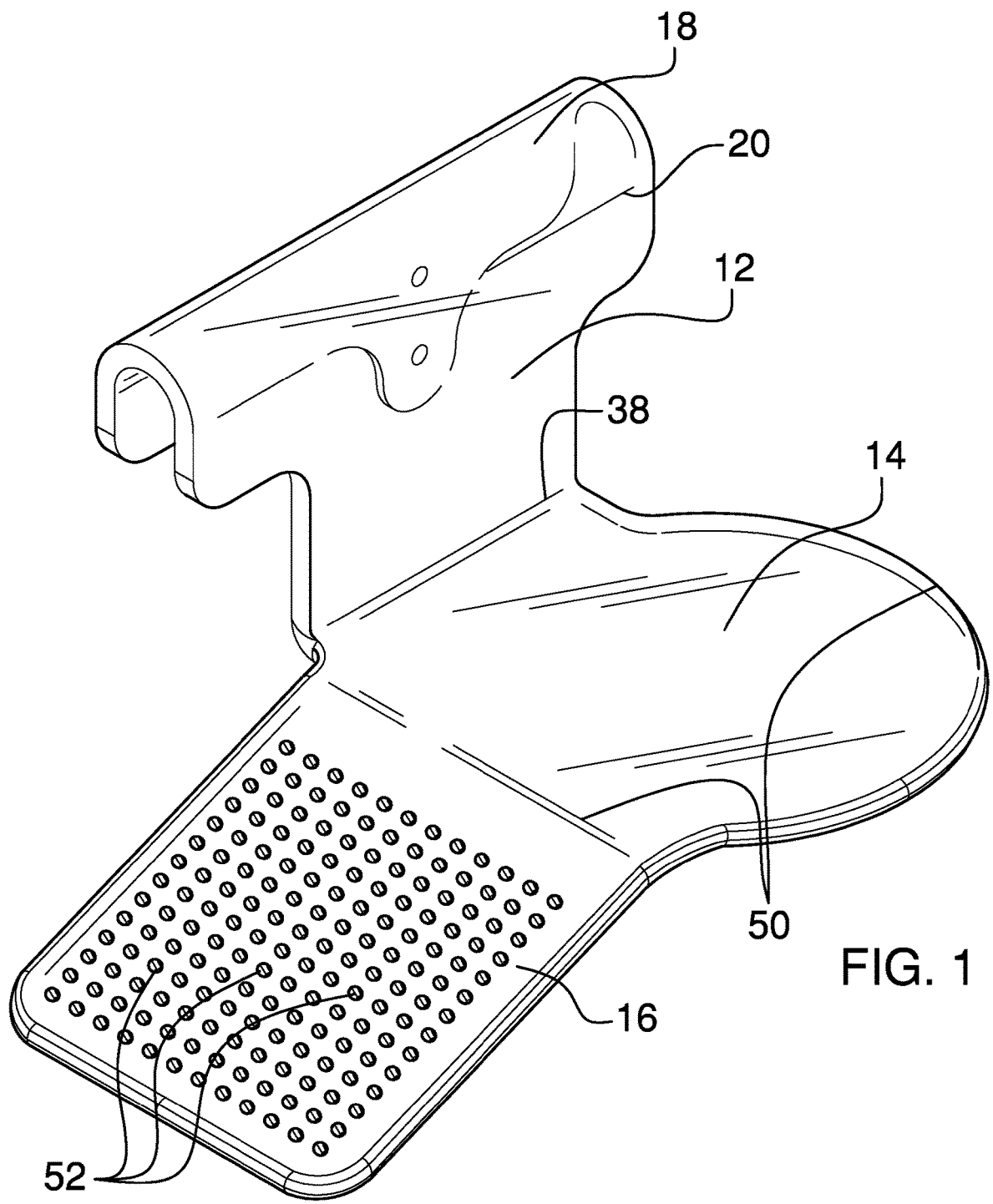
FIG. 1 is an isometric perspective view of a ramped platform device according to an embodiment of the disclosure.

With reference now to the drawings, and in particular to FIGS. 1 through 6 thereof, a new platform device embodying the principles and concepts of an embodiment of the disclosure and generally designated by the reference numeral 10 will be described.

Figure 4:
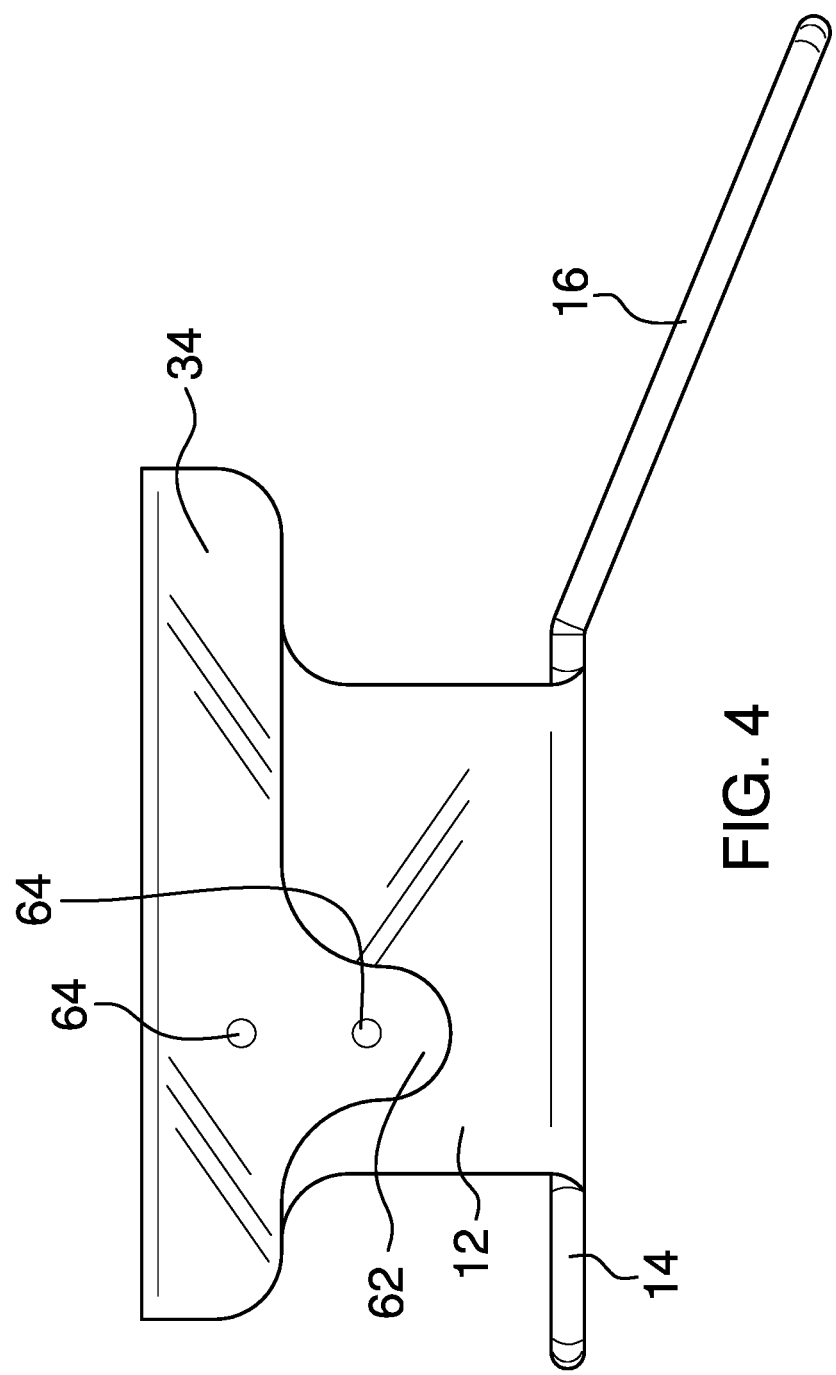
FIG. 4 is a back view of an embodiment of the disclosure.
Figure 5:
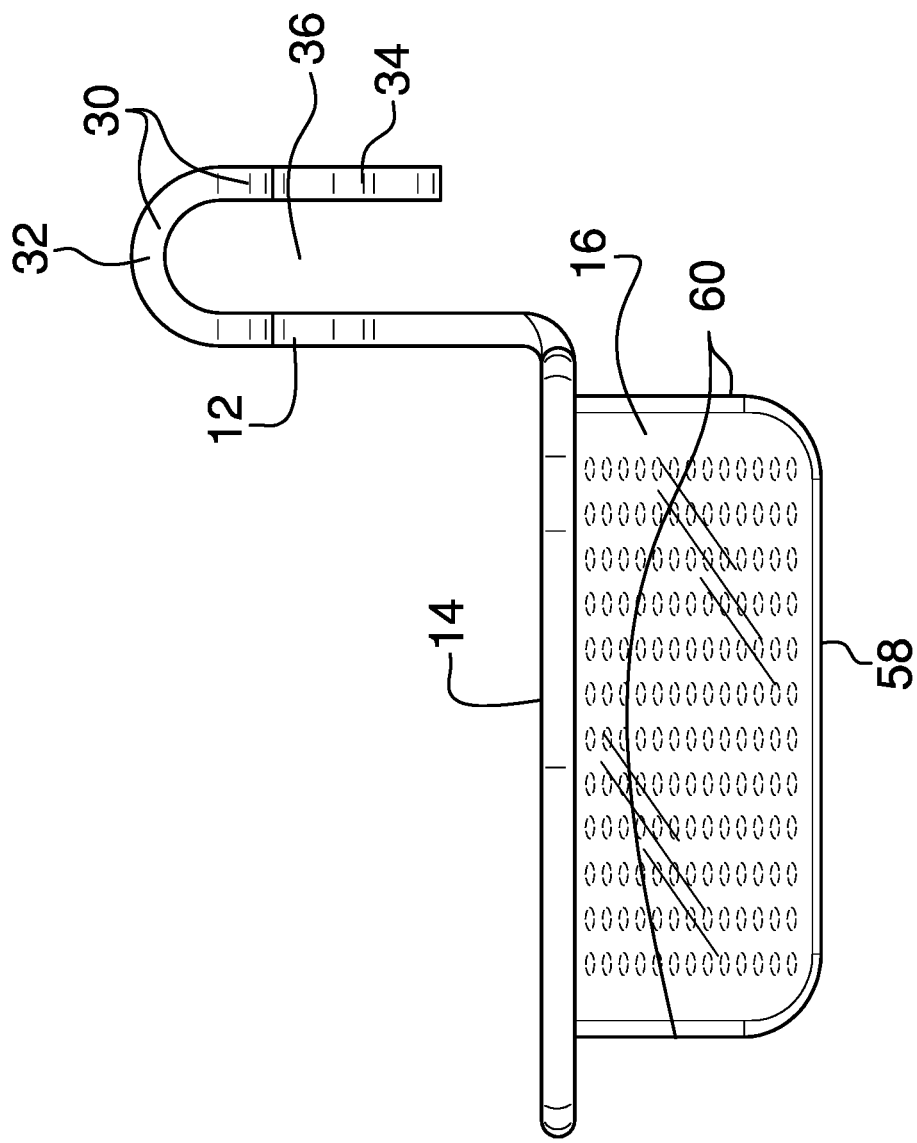
FIG. 5 is a side view of an embodiment of the disclosure.
Figure 6:
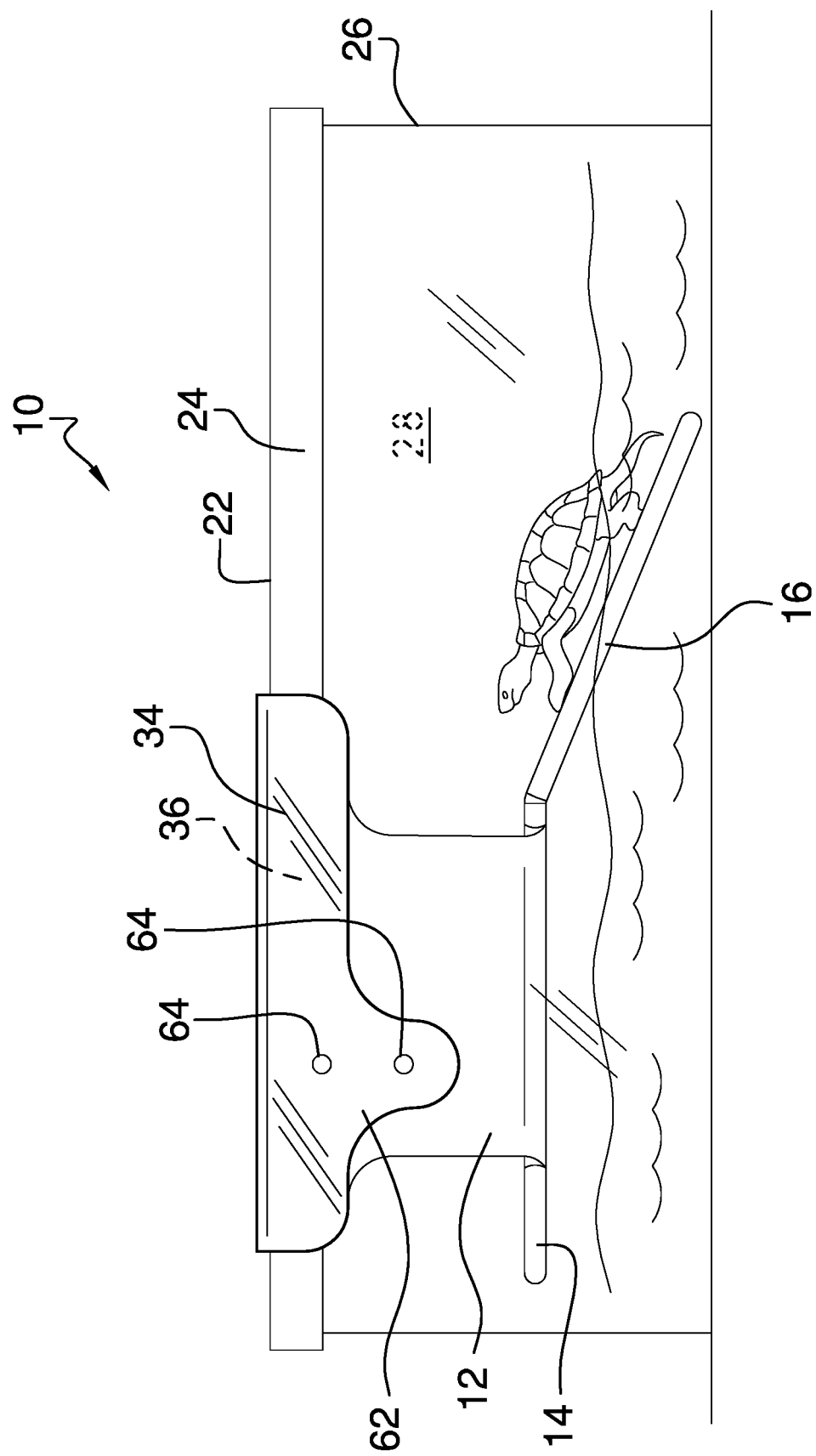
FIG. 6 is an in-use view of an embodiment of the disclosure.

As best illustrated in FIGS. 1 through 6, the ramped platform device 10 generally comprises a first plate 12, a platform 14, and a second plate 16. The first plate 12 has a fastener 18 engaged to an upper end 20 thereof. The fastener 18 is configured to engage an upper rim 22 of a wall 24 of a vivarium 26, such as an aquarium or a terrarium. The first plate 12 is in substantial abutment to an inner face 28 of the wall 24. The first plate 12 may be planar and configured to substantially abut the inner face 28 of a flat wall 24 of a vivarium 26, as shown in FIG. 6. The first plate 12 may be curved (not shown) versus planar so that the first plate 12 can be positioned in substantial abutment to an inner face 28 of a curved wall 24 of a vivarium 26.

The fastener 18 may comprise an extension 30 of the first plate 12, or other fastening means, such as, but not limited to, clamps, hook and loop fasteners, and the like. The extension 30 comprises a first section 32, which extends arcuately from the upper end 20 of the first plate 12, as shown in FIG. 5, and a second section 34 that extends from the first section 32 so that the second section 34 is substantially parallel planar to the first plate 12. The extension 30 and the first plate 12 define a channel 36 that is configured to insert the upper rim 22 of the wall 24 to removably couple the first plate 12 to the wall 24, as shown in FIG. 6.

Figure 3:
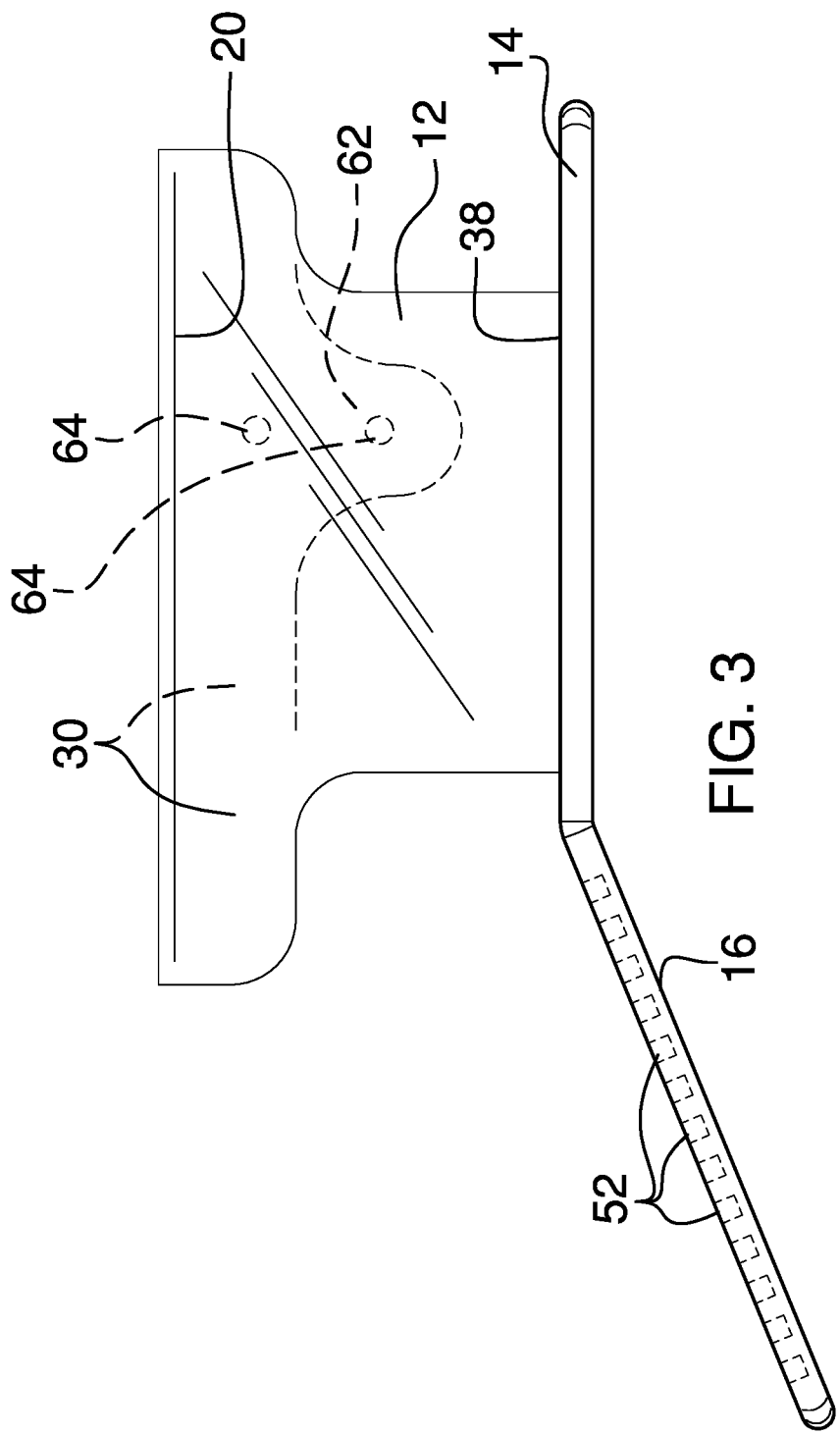
FIG. 3 is a front view of an embodiment of the disclosure.

The first plate 12 may be dimensionally wider adjacent to the upper end 20 relative to adjacent to a lower end 38 of the first plate 12, as shown in FIG. 3. Thus configured, the extension 30 and the channel 36 are dimensionally wider than the lower end 38 and the fastener 18 resists rotation of the first plate 12 relative to the wall 24 of the vivarium 26.

The platform 14 is coupled to and extends substantially perpendicularly from the lower end 38 of the first plate 12. The platform 14 comprises a first portion 40 that is right triangularly shaped to define a pair of right edges 42 and a connecting edge 44. The connecting edge 44 has a second portion 46 of the platform 14 extending coplanarly therefrom to define a distal limit 48 of the second portion 46. The second portion 46 may be substantially half ovally shaped, or alternatively shaped, such as, but not limited to, semicircularly shaped, triangularly shaped, and the like.

The second plate 16 is coupled to and extends transversely and downwardly from a perimeter 50 of the platform 14. The second plate 16 is configured for traversal of an animal to and from the platform 14. The present invention is anticipated to be useful in vivaria 26 housing reptiles, amphibians, and mammals. The platform 14 can be used as a resting place by the animal. If the vivarium 26 is equipped with a heat source, the platform 14 can be positioned under the heat source so that the animal can ascend to the platform 14 as desired to be warmed.

The second plate 16 may extend from one of the pair of right edges 42 and the first plate 12 may extend from the other of the pair of right edges 42, as shown in FIG. 1. With the second portion 46 of the platform 14 being alternatively shaped, such as triangularly shaped, the second plate 16 the first plate 12 may be opposingly positioned on the perimeter 50 of the platform 14 (not shown).

The second plate 16 may have a plurality of recesses 52 that extends into an upper face 54 thereof. The recesses 52 are configured to enhance traction of the animal upon the second plate 16. The present invention anticipates other traction enhancing means, such as, but not limited to, ridges coupled to and extending from the upper face 54 of the second plate 16, non-slip material coupled to the upper face 54, and the like.

Figure 2:
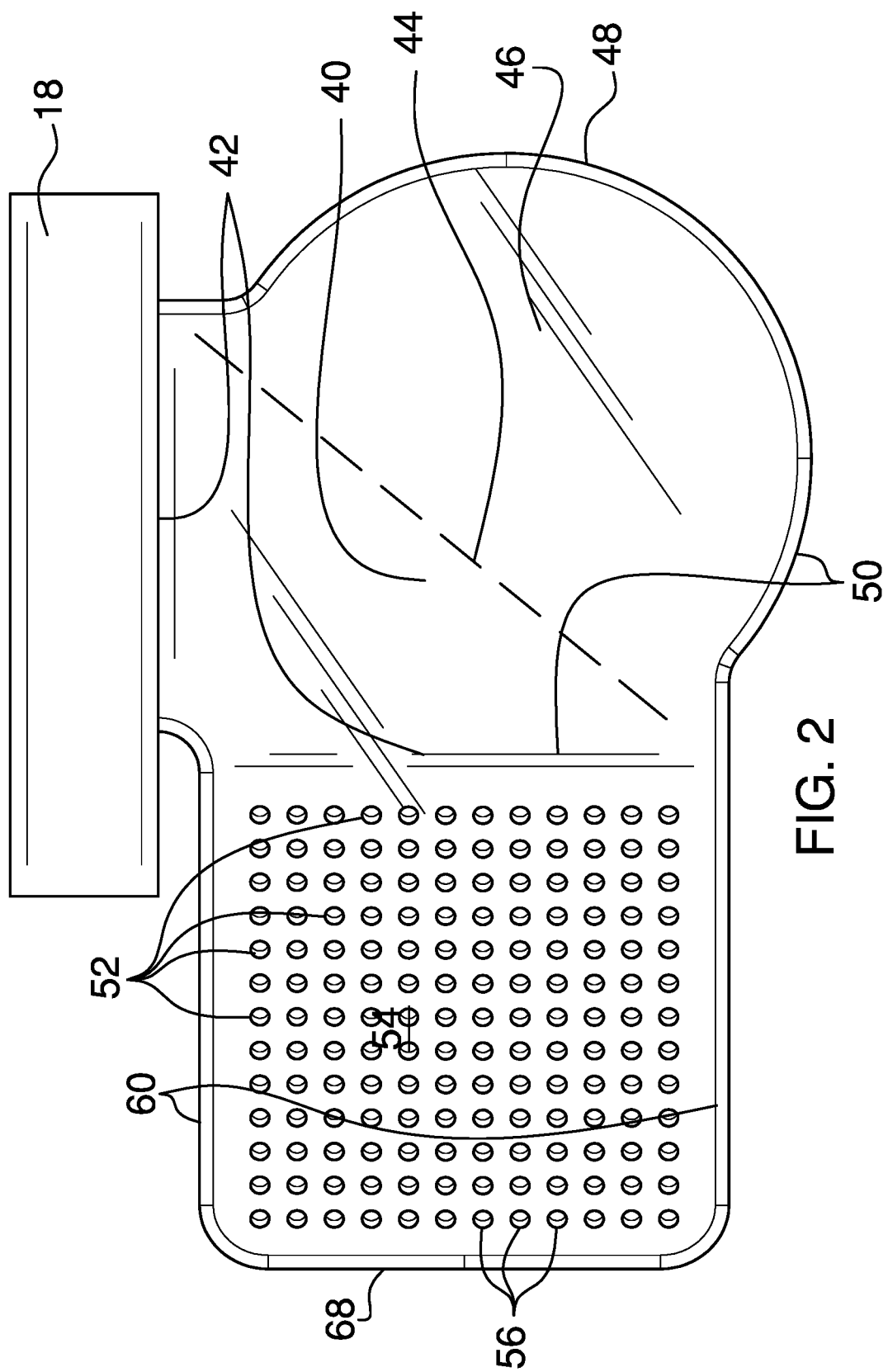
FIG. 2 is a top view of an embodiment of the disclosure.

The recesses 52 may extend through the second plate 16 (not shown). As such, the recesses 52 would be configured to drain water from the upper face 54. Each recess 52 may be circularly shaped, as shown in FIG. 2, or alternatively shaped, such as, but not limited to, ovally shaped, squarely shaped, and the like.

The recesses 52 may be positioned in a plurality of rows 56, with each row 56 extending from proximate to the platform 14 to proximate to a terminal edge 58 of the second plate 16. The plurality of rows 56 extends from proximate to opposed edges 60 of the second plate 16. The present invention also anticipates alternative positioning of the recesses 52 in the second plate 16, such as, but not limited to, random positioning, concentric circle positioning, and the like.

The opposed edges 60 and the terminal edge 58 of the second plate 16, along with the distal limit 48 of the second portion 46 of the platform 14, are rounded to reduce risk of injury to the animal.

A protrusion 62 is coupled to and extends coplanarly from the second section 34 of the extension 30. The protrusion 62 and the second section 34 each have a hole 64 positioned therethrough, as shown in FIG. 4. The holes 64 are configured to allow insertion of connectors (not shown) to couple an accessory, such as a heat lamp, to the extension 30.

In use, the device 10 is inserted into the vivarium 26 so that the upper rim 22 of the wall 24 is inserted into the channel 36 to couple the device 10 to the vivarium 26. The second plate 16 thus is configured for traversal of the animal to and from the platform 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A ramped platform device comprising:
   a first plate having a fastener engaged to an upper end thereof and configured for engaging an upper rim of a wall of a vivarium, such that the first plate abuts an inner face of the wall;
   a platform coupled to and extending perpendicularly from a lower end of the first plate;
   a second plate coupled to and extending transversely and downwardly from a perimeter of the platform, wherein the second plate is configured for traversal of an animal to and from the platform;
   wherein the fastener comprises an extension of the first plate, the extension comprising a first section extending arcuately from the upper end of the first plate and a second section extending from the first section, the second section being planar and positioned such that the second section is parallel to the first plate, and such that the extension and the first plate define a channel configured for inserting the upper rim of the wall for removably coupling the first plate to the wall; and
   a protrusion coupled to and extending coplanarly from the second section of the extension, the protrusion and the second section each having a respective hole positioned therethrough, the respective holes being positioned in vertical alignment with each other such that the respective holes are configured to be positioned aligned perpendicular to the upper rim of the wall of the vivarium when the fastener is engaged to the wall of the vivarium, the respective holes being configured for insertion of connectors for coupling an accessory to the extension.

2. The ramped platform device of claim 1, wherein the first plate is planar and configured to abut the inner face of the wall of the vivarium.

3. The ramped platform device of claim 1, wherein the first plate is dimensionally wider adjacent to the upper end relative to adjacent to the lower end of the first plate such that the extension and the channel are dimensionally wider than the lower end.

4. The ramped platform device of claim 1, wherein:
   the platform comprises a first portion, the first portion being right triangularly shaped and defining a pair of right edges and a connecting edge;
   the second plate extends from one of the pair of right edges; and
   the first plate extends from the other of the pair of right edges.

5. The ramped platform device of claim 4, further including the connecting edge having a second portion of the platform extending coplanarly therefrom and defining a distal limit of the second portion.

6. The ramped platform device of claim 5, wherein the second portion is half ovally shaped.

7. The ramped platform device of claim 5, wherein the distal limit is rounded.

8. The ramped platform device of claim 1, further including the second plate having a plurality of recesses extending into an upper face thereof, wherein the recesses are configured for enhancing traction of the animal upon the second plate.

9. The ramped platform device of claim 8, wherein the recesses extend through the second plate and are configured to drain water from the upper face.

10. The ramped platform device of claim 8, wherein each of the recesses is circularly shaped.

11. The ramped platform device of claim 8, wherein the recesses are positioned in a plurality of rows, each of the rows extending from proximate to the platform to proximate to a terminal edge of the second plate.

12. The ramped platform device of claim 11, wherein the plurality of rows extends from proximate to opposed edges of the second plate.

13. The ramped platform device of claim 1, wherein opposed edges and a terminal edge of the second plate are rounded.

14. A ramped platform device comprising:
- a first plate having a fastener engaged to an upper end thereof and configured for engaging an upper rim of a wall of a vivarium, such that the first plate to abuts an inner face of the wall, the first plate being planar, wherein the first plate is configured for abutting the inner face of the flat wall of the vivarium, the fastener comprising an extension of the first plate, the extension comprising a first section extending arcuately from the upper end of the first plate and a second section extending from the first section, the second section being planar and positioned such that the second section is parallel to the first plate and such that the extension and the first plate define a channel configured for inserting the upper rim of the wall for removably coupling the first plate to the wall, the first plate being dimensionally wider adjacent to the upper end relative to adjacent to a lower end of the first plate such that the extension and the channel are dimensionally wider than the lower end;
- a protrusion coupled to and extending coplanarly from the second section of the extension, the protrusion and the second section each having a respective hole positioned therethrough, the respective holes being positioned in vertical alignment with each other such that the respective holes are configured to be positioned aligned perpendicular to the upper rim of the wall of the vivarium when the fastener is engaged to the wall of the vivarium, the respective holes being configured for insertion of connectors for coupling an accessory to the extension;
- a platform coupled to and extending perpendicularly from the lower end of the first plate, the platform comprising a first portion, the first portion being right triangularly shaped and defining a pair of right edges and a connecting edge, the connecting edge having a second portion of the platform extending coplanarly therefrom and defining a distal limit of the second portion, the second portion being half ovally shaped, the distal limit being rounded; and
- a second plate coupled to and extending transversely and downwardly from a perimeter of the platform, wherein the second plate is configured for traversal of an animal to and from the platform, the second plate extending from one of the pair of right edges and the first plate extending from the other of the pair of right edges, the second plate having a plurality of recesses extending into an upper face thereof, wherein the recesses are configured for enhancing traction of the animal upon the second plate, the recesses extending through the second plate, wherein the recesses are configured for draining water from the upper face, each of the recesses being circularly shaped, the recesses being positioned in a plurality of rows, each of the rows extending from proximate to the platform to proximate to a terminal edge of the second plate, the plurality of rows extending from proximate to opposed edges of the second plate, the opposed edges and the terminal edge of the second plate being rounded.

* * * * *